(12) United States Patent
Anzelmo et al.

(10) Patent No.: US 12,384,901 B2
(45) Date of Patent: Aug. 12, 2025

(54) COMPOSITE MATERIALS FOR ANTI-BALLISTIC APPLICATIONS AND METHODS OF FABRICATION THEREOF

(71) Applicant: Lyten, Inc., San Jose, CA (US)

(72) Inventors: Bryce H. Anzelmo, Parsippany, NJ (US); Saemi Poelma, Sunnyvale, CA (US); Peter Boul, Emerald Hills, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/611,504

(22) Filed: Mar. 20, 2024

(65) Prior Publication Data

US 2024/0317962 A1    Sep. 26, 2024

Related U.S. Application Data

(60) Provisional application No. 63/521,240, filed on Jun. 15, 2023, provisional application No. 63/464,475,
(Continued)

(51) Int. Cl.
*C08K 3/04* (2006.01)
*F41H 5/02* (2006.01)

(52) U.S. Cl.
CPC ........... *C08K 3/04* (2013.01); *C08K 3/042* (2017.05); *C08K 2201/001* (2013.01); *F41H 5/02* (2013.01)

(58) Field of Classification Search
CPC .................................... C08K 3/042
See application file for complete search history.

(56) References Cited

U.S. PATENT DOCUMENTS 9,731,971 B2    8/2017    Cooper et al.
2001/0031900 A1*  10/2001    Margrave ........... B82Y 40/00
                                                                  530/350
(Continued)

FOREIGN PATENT DOCUMENTS

EP           3268311 B1    11/2023
IN    202321039845 A     8/2023
(Continued)

OTHER PUBLICATIONS

Choosri (Ultra-high-molecular-weight polyethylene (UHMWPE) Nanocomposite for Self-sensing orthopedic implants, 2017) (Year: 2017).*

(Continued)

*Primary Examiner* — Liam J Heincer
(74) *Attorney, Agent, or Firm* — Zilka-Kotab, P.C.

(57) ABSTRACT

A composite material, methods for its fabrication and example applications. The composite material comprises a polymer having a carbon allotrope incorporated into the polymer's crystalline structure. The material is characterized by a crystallinity greater than the native crystallinity of the polymer in the absence of the carbon allotrope being incorporated into the polymer's crystalline structure. The composite material is non-laminate, substantially excludes metals, ceramics, and cermets, and is electrically conductive. The carbon allotrope serves as a bridge between a first region of the polymer and a second region of the polymer. The fabrication method involves mixing a powder of polymer and carbon allotrope particles, suspending the powder in a solvent, spinning the solution into fibers, and drawing the fibers into a composite material. Applications include collecting data responsive to stimulating the composite material, comparing the data to thresholds, determining the
(Continued)

material's condition, and transmitting a decision regarding its continued use.

26 Claims, 6 Drawing Sheets

Related U.S. Application Data filed on May 5, 2023, provisional application No. 63/453,720, filed on Mar. 21, 2023.

(56) References Cited

U.S. PATENT DOCUMENTS

| | | | | |
|---|---|---|---|---|
| 2008/0292529 | A1* | 11/2008 | Gardner | C01B 32/05 423/445 R |
| 2012/0244333 | A1* | 9/2012 | Aksay | D01F 1/10 428/221 |
| 2015/0218730 | A1* | 8/2015 | Dang | C08K 3/042 264/211.14 |
| 2016/0122497 | A1* | 5/2016 | Al-Harthi | C08K 3/04 524/855 |
| 2020/0362137 | A1* | 11/2020 | Nosker | B32B 25/14 |
| 2021/0363321 | A1* | 11/2021 | Nosker | B29C 48/397 |
| 2021/0402731 | A1 | 12/2021 | Konyu et al. | |

FOREIGN PATENT DOCUMENTS

| | | |
|---|---|---|
| WO | 2014197082 A2 | 12/2014 |
| WO | 2023277935 A1 | 1/2023 |

OTHER PUBLICATIONS

Dijkstra et al. (Colloid Polym Sci 267:866-875, 1989) (Year: 1989).*

Finniss et al. (Journal of Applied Polymer Science, 2016, 44166) (Year: 2016).*

Kuclourya et al., "A review on Graphene Reinforced Composites for Ballistic applications," IOP Conference Series: Materials Science and Engineering, vol. 1123, 2021, pp. 1-9.

Naveen et al., "Advancement in Graphene-Based Materials and Their Nacre Inspired Composites for Armour Applications—A Review," Nanomaterials, vol. 11, 2021, pp. 1-17.

Santos Da Luz et al., "Graphene-Incorporated Natural Fiber Polymer Composites: A First Overview," Polymers, vol. 12, 2020, pp. 1-36.

Lynch, J., "High Performance, Lightweight Graphene Enhanced Polymer Matrix Composites for Defense Applications," Journal of the NATO Science and Technology Organization: Applied Vehicle Technology Panel, vol. 2, 2020, pp. 18-28.

Costa et al., "Characterization and ballistic performance of hybrid jute and aramid reinforcing graphite nanoplatelets in high-density polyethylene nanocomposites," Journal of Materials Research and Technology, vol. 28, 2024, pp. 1570-1583.

Dai et al., "Multifunctional Polymer-Based Graphene Foams with Buckled Structure and Negative Poisson's Ratio," Scientific Reports, vol. 6, 2016, pp. 1-9.

* cited by examiner

COMPOSITE MATERIALS FOR ANTI-BALLISTIC APPLICATIONS AND METHODS OF FABRICATION THEREOF

RELATED APPLICATIONS

The present application claims priority to U.S. Provisional Patent Application No. 63/521,240 filed Jun. 15, 2023 and entitled "ULTRA CONDUCTIVE METAL SUBSTRATES", the contents of which are herein incorporated by reference; the present application also claims priority to U.S. Provisional Patent Application No. 63/464,475 filed May 5, 2023 and entitled "ULTRA CONDUCTIVE METAL SUBSTRATES", the contents of which are herein incorporated by reference; the present application also claims priority to U.S. Provisional Patent Application No. 63/453,720 filed Mar. 21, 2023 and entitled "Fabrication of Ultra High Molecular Weight PE (UHMWPE)", the contents of which are herein incorporated by reference.

FIELD OF THE INVENTION

The present disclosure generally relates to the field of composite materials, and more specifically, to the fabrication and utilization of single-layer, electrically conductive, carbon-reinforced polymeric materials with enhanced mechanical strength and crystallinity that make them particularly suitable for anti-ballistic applications, such as armors, aerospace applications, mining, etc.

BACKGROUND

Composite materials are widely used in various applications due to their advantageous properties, such as high strength, light weight, and versatility. In particular, composite materials have found extensive use in anti-ballistic applications, where they are used to fabricate protective equipment such as armors, shields, and protective clothing. These applications require materials that can withstand high impact forces, such as those generated by bullets, shrapnel, or other high-speed projectiles.

Conventional anti-ballistic materials include a laminate structure, specifically a bi-layer structure where one layer is a polymeric layer, and the other layer is a conductive layer. The polymeric layer provides mechanical strength, while the conductive layer may act as a sensor enabling interrogation of the mechanical integrity of the material, among other diagnostic information about the material or the user (e.g., in the case of armor).

The fabrication of composite materials for anti-ballistic applications presents several challenges. For instance, achieving a uniform distribution of carbon allotropes within the polymer matrix can be difficult. Additionally, the different mechanical properties of the polymeric layer and the conductive layer in a laminate structure can lead to issues such as delamination, which can compromise the mechanical strength of the material and interfere with the signal received from the conductive layer.

Conventional materials also commonly include or adhered to ceramics, cermets, or metals (e.g., in the form of a plate), which significantly contribute to overall weight of the material. Given intended applications, particularly in armors or aerospace applications, weight is a significant limitation on the utility of the material.

In the context of anti-ballistics, and as illustrated in FIGS. 1A-1C, when impacted by a hard projectile such as a bullet or other munition, a micrometeoroid, space debris, etc., the projectile forms a fracture conoid within the impacted layer (typically the polymeric layer and/or ceramic/cermet/metal plate), which causes a plurality of microfractures to form therein, and ultimately results in failure of the material as a whole, allowing penetration by the projectile or fragments thereof and damage to the system or user.

The conductive layer can provide "actionable tasks" (heart rate, sweat, body temperature, humidity, presence or absence of an electrical connection to the system employing the material, etc.) that provide diagnostics regarding the user's or system's suitability to continue operating. Conventional approaches require multiple garments or additional layers for each data point, which can be incompatible or interfere with one another. For example, one system might include a chainmail layer, a sensor layer, and a wicking (thermal insulating) layer to provide different functionalities.

Moreover, conventional approaches sample the material at intervals (e.g. every couple hundred feet). This does not allow for continuous interrogation of the structural integrity of the material. Alignment/drawing of the material can be inconsistent and create defects.

Additional problems with conventional laminate composites include: inability to continuously and actively determine integrity of the material, and determine whether to continue operating in the field; inflexibility of laminates causing conventional armors to be at least "semi-rigid", differing Young's modulus of polymeric layer and conductive layer often causes "sliding" between the layers, and results in delamination, which reduces mechanical strength and also interferes with the signal received from the conductive layer; incompatibility of laminates with many available adhesives, which requires surface treatment of the fibers to be compatible with the additional materials (e.g. support plates), but detrimentally impacts the fiber (e.g. acid etching, or other decomposition of fiber); and weak bonding between olefin molecules allows local thermal excitations to disrupt crystalline structures and therefore have lower heat resistance than other high-strength fibers.

As such, there is thus a need for addressing these and/or other issues associated with the prior art.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Compositions of matter, suitable systems implementing said compositions of matter, methods of fabricating such compositions of matter and corresponding systems, as well as various applications for improving, among other characteristics, strength to weight ratio of anti-ballistic materials are disclosed according to various aspects, implementations, and embodiments of the inventive concepts presented herein.

According to an aspect of the present disclosure, a composite material includes a polymer and a carbon allotrope incorporated into a crystalline structure of the polymer. The composite material is characterized by a crystallinity that is greater than a native crystallinity of the polymer in absence of the carbon allotrope. The polymer may comprise ultra high molecular weight polyethylene (UHMWPE), and the carbon allotrope may be selected from the group consisting of 2D graphene, 3D graphene, carbon nano-onions (CNOs), graphene platelets, layered carbons, carbon rings, polyaromatic hydrocarbons (PAHs), doped graphene, and combinations thereof.

According to another aspect of the instant disclosure, a composite material includes a polymer characterized by a first crystallinity and a carbon allotrope incorporated into a crystalline structure of the polymer. The composite material is characterized by a second crystallinity that is greater than the first crystallinity. The polymer may comprise ultra high molecular weight polyethylene (UHMWPE), and the carbon allotrope may be selected from the group consisting of 2D graphene, 3D graphene, carbon nano-onions (CNOs), graphene platelets, layered carbons, carbon rings, polyaromatic hydrocarbons (PAHs), doped graphene, and combinations thereof.

According to other aspects of the present disclosure, the composite material may include one or more of the following features. The composite material may be characterized by a non-laminate structure and may substantially exclude metals, ceramics, and cermets. The composite material may be electrically conductive and may be characterized by a crystal grain size in a range from about 2 nm to about 200 nm. The carbon allotrope may form an anchor bridging a first region of the polymer and a second region of the polymer.

According to another aspect of the present disclosure, a system includes a composite material comprising a polymer and a carbon allotrope incorporated into a crystalline structure of the polymer. The composite material is characterized by a crystallinity that is greater than a native crystallinity of the polymer in absence of the carbon allotrope.

According to yet another aspect of the present disclosure, a method of fabricating composite materials includes mixing a powder comprising particles of a polymer and particles of a carbon allotrope, suspending the powder in a solvent, heating the suspension until the powder is dissolved in the solvent, spinning the solution into a plurality of fibers, drying the plurality of fibers, and drawing the plurality of fibers into a composite material.

According to still yet another aspect of the present disclosure, a method of utilizing a composite material includes receiving stimulus/response data from the composite material, comparing the stimulus/response data to one or more stimulus/response thresholds, determining whether a condition of the composite material is sufficient to continue use thereof, and transmitting a decision regarding continued use of the composite material to the composite material, a user thereof, or a system including the composite material.

The foregoing general description of the illustrative embodiments and the following detailed description thereof are merely exemplary aspects of the teachings of this disclosure and are not restrictive. Additional aspects of the inventive concepts will be appreciated upon full review of the following detailed descriptions and accompanying drawings.

BRIEF DESCRIPTION OF THE DRAWINGS

Non-limiting and non-exhaustive examples are described with reference to the following figures.

DETAILED DESCRIPTION

Figure 1A:
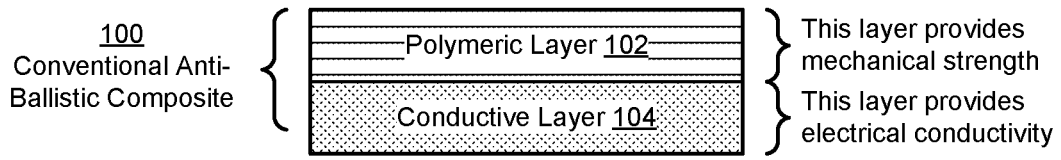
FIGS. 1A-1C depict simplified schematics of a conventional bi-layer anti-ballistic material, and the effect of impact thereon by a ballistic hard projectile, according to the prior art.

The following description is made for the purpose of illustrating the general principles of the present invention and is not meant to limit the inventive concepts claimed herein. Further, particular features described herein can be used in combination with other described features in each of the various possible combinations and permutations, unless otherwise expressly declared.

The present disclosure generally relates to the field of composite materials, and more specifically, to the fabrication and utilization of single-layer, electrically conductive, carbon-reinforced polymeric materials with enhanced mechanical strength and crystallinity. These materials may be particularly suitable for anti-ballistic applications, where they can be used to fabricate protective equipment such as armors, shields, and protective clothing.

Definitions

"Ballistics" as described herein refers to the field of mechanics concerned with the launching, flight behavior and impact effects of projectiles, especially ranged weapon munitions such as bullets, unguided bombs, rockets or the like; the science or art of designing and accelerating projectiles so as to achieve a desired performance.

The term "ballistic body" (or equivalently, "ballistic projectile") is a free-moving body with momentum which can be subject to forces such as the forces exerted by pressurized gases from a gun barrel or a propelling nozzle, normal force by rifling, and gravity and air drag during flight. Ballistic bodies (or equivalently, "projectiles") as referenced herein shall be understood to include any type of contemporary munitions, as well as small, fast, free-moving bodies such as micrometeoroids, space debris, etc. as would be understood by those having ordinary skill in the art upon reading the present disclosure.

Elongate materials (e.g., materials having an aspect ratio greater than 1, such as fibers) shall be considered "oriented" or having a "common orientation" when the longitudinal axes of the materials are substantially parallel, such as deviating from parallel by an amount of 5 degrees or less, 3.33 degrees or less, 2.5 degrees or less, 2 degrees or less, 1 degree or less, 0.5 degrees or less, or 0 degrees, according to various embodiments.

A material is to be understood as "non-laminate" when the material is characterized by a single-layer structure, a monolithic structure, or other structure characterized by absence of distinct layers of different compositions.

"Crystallinity" as utilized herein shall be understood as referring to different types (i.e., phases and geometries) and/or degree (e.g. %) of crystalline structures, particularly crystalline polymeric structures. More specifically, "crystallinity" as discussed herein refers to the Bravais lattice, which is an infinite array of discrete points generated by a set of discrete translation operations described in three dimensional space by $$R = n_1 a_1 + n_2 a_2 + n_3 a_3 \qquad \text{Eqn. (1)}$$

where the $n_i$ are any integers, and $a_i$ are primitive translation vectors, or primitive vectors, which lie in different directions (not necessarily mutually perpendicular) and span the lattice. In accordance with the Bravais lattice, there are seven lattice systems: cubic, triclinic, monoclinic, hexagonal, rhombohedral, orthorhombic, and tetragonal.

"Native crystallinity" as utilized herein, shall be understood as referring to a type and/or degree of crystallinity exhibited by a particular material, especially a polymeric material, in pure form, i.e., without any additives, dopants, functionalization, etc. that modifies the type and/or degree of crystallinity of the pure material.

Moreover, materials are considered to "substantially exclude" a particular component, feature, property, etc. when the material either completely lacks the particular component, feature, property, etc., or when the material includes the particular component, feature, property, etc., in a trace amount that does not contribute to the mechanical, chemical, electrical, thermal, optical, or other properties of the material.

General Embodiments

Several illustrative general embodiments of the presently described inventive concepts will now be presented by way of example. It shall be understood that various implementations of these general embodiments may exclude certain limitations, components, features, properties, etc., and/or may include additional or alternative components, features, properties, etc., without departing from the scope of the inventive concepts disclosed herein.

According to one general embodiment, a composite material includes: a polymer; and a carbon allotrope incorporated into a crystalline structure of the polymer, wherein the composite material is characterized by a crystallinity that is greater than a native crystallinity of the polymer in absence of the carbon allotrope.

According to another general embodiment, a composite material includes a polymer characterized by a first crystallinity and a carbon allotrope incorporated into a crystalline structure of the polymer. The composite material is characterized by a second crystallinity that is greater than the first crystallinity.

According to yet another general embodiment, a system includes a composite material comprising a polymer; and a carbon allotrope incorporated into a crystalline structure of the polymer, wherein the composite material is characterized by a crystallinity that is greater than a native crystallinity of the polymer in absence of the carbon allotrope. For instance, the system may be an armor, an armor component, a satellite, a rocket, an armored vehicle such as an armored personnel carrier (APC), a tank, a submarine, a ship, an airplane, etc. without limitation and without departing from the scope of the instantly described inventive concepts.

According to still yet another general embodiment, a method of fabricating composite materials includes: mixing a powder comprising particles of a polymer and particles of a carbon allotrope; suspending the powder in a solvent; heating the suspension until the powder is dissolved in the solvent; spinning the solution into a plurality of fibers; drying the plurality of fibers; and drawing the plurality of fibers into a composite material.

According to still further yet another general embodiment, a method of utilizing a composite material includes: receiving stimulus/response data from the composite material; comparing the stimulus/response data to one or more stimulus/response thresholds; determining whether a condition of the composite material is sufficient to continue use thereof; and transmitting a decision regarding continued use of the composite material to the composite material, a user thereof, or a system including the composite material.

Figure 1B:
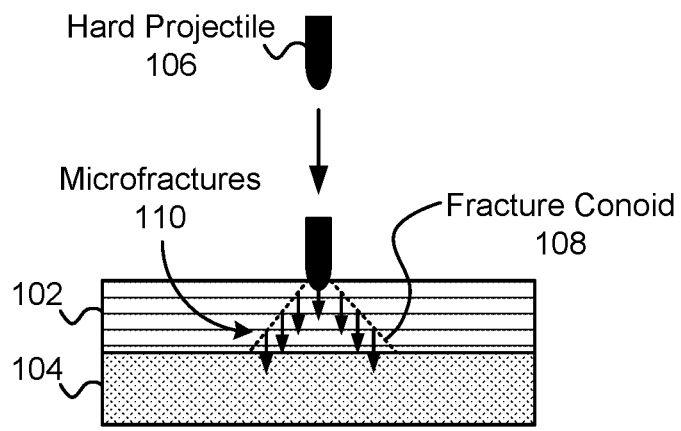
Figure 1C:
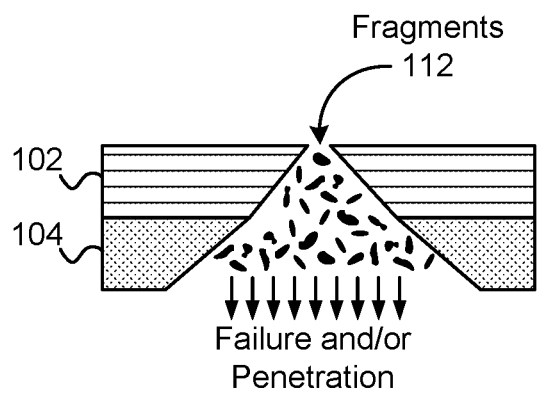

Detailed Descriptions of Exemplary Implementations and Aspects of the Inventive Concepts FIGS. 1A-1C depict simplified schematics of a conventional, bi-layer anti-ballistic composite 100, and the effect of impact thereon by a ballistic hard projectile, according to the prior art.

FIG. 1A features the general bi-layer configuration of conventional anti-ballistic materials. While not shown, in some approaches the conventional, bi-layer anti-ballistic composite 100, may be coupled (e.g., adhered) to a support plate comprising metal(s), ceramic(s), cermet(s), etc. as known in the art. In additional approaches, either or both of the polymeric layer 102 and the conductive layer 104 may comprise metal(s), ceramic(s), and/or cermet(s).

FIG. 1B shows the conventional, bi-layer anti-ballistic composite 100 as depicted in FIG. 1A upon impact of a hard projectile 106 such as a bullet, micrometeoroid, piece of space debris, etc. Upon impact by the hard projectile 106, a plurality of microfractures 110 are formed within a region defined by a fracture conoid 108. The fracture conoid may, depending on the nature of the material (e.g., rigid, semi-rigid, flexible), be characterized by an angle in a range from about 30 degrees to about 45 degrees with respect to the surface impacted by the hard projectile 106.

FIG. 1C depicts penetration or failure of the conventional, bi-layer anti-ballistic composite 100 moments after impact thereon by the hard projectile 106, which has broken up into a plurality of fragments 112.

Figure 2A:
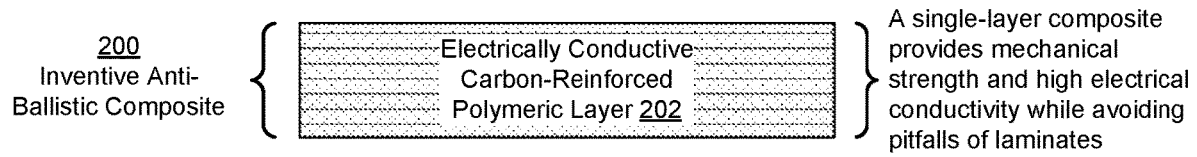
FIGS. 2A-2C depict simplified schematics of the inventive, single-layer composite materials, and the effect of impact thereon by a ballistic hard projectile, according to one implementation of the presently described inventive concepts.

FIG. 2A illustrates a simplified schematic of a composite material 200 for anti-ballistic applications, in accordance with one embodiment. As an option, the composite material 200 may be implemented in the context of any one or more of the embodiments set forth in any previous and/or subsequent figure(s) and/or description thereof. Of course, however, the composite material 200 may be implemented in the context of any desired environment. Further, the aforementioned definitions may equally apply to the description below.

Figure 2B:
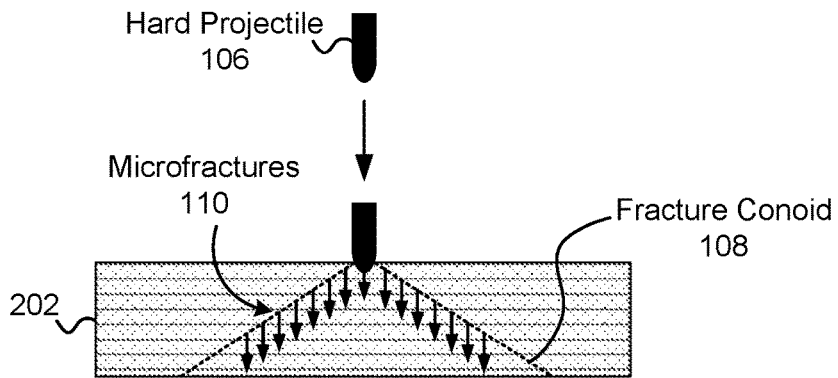
Figure 2C:
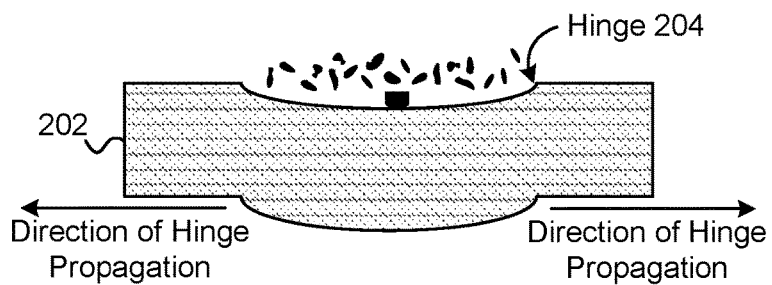

Note that the inventive composite material 200 as shown in FIGS. 2A-2C is a single-layer, non-laminate, monolithic structure that provides mechanical strength and electrical conductivity in the form of an electrically conductive, carbon-reinforced polymeric layer 202. Advantageously the electrically conductive, carbon-reinforced polymeric layer 202 also facilitates dispersion of mechanical forces while avoiding the pitfalls of laminate materials described herein above.

In some aspects, the composite materials disclosed herein may include a polymer and a carbon allotrope incorporated into a crystalline structure of the polymer. The composite material may be characterized by a crystallinity that is greater than a native crystallinity of the polymer in absence of the carbon allotrope. The polymer may comprise ultra-high molecular weight polyethylene (UHMWPE), and the carbon allotrope may be selected from the group consisting of 2D graphene, 3D graphene, carbon nano-onions (CNOs), graphene platelets, polyaromatic hydrocarbons (PAHs), doped graphene, and combinations thereof.

In the case of graphene platelets, each platelet may be characterized by one or more structural features such as being substantially flat, having a diameter of about 250 nm or less (e.g., a nonzero diameter of about 10 nm, about 25 nm, about 33 nm, about 50 nm, about 66 nm, about 75 nm, about 90 nm, about 100 nm, about 125 nm, about 133 nm, about 150 nm, about 166 nm, about 175 nm, about 200 nm, about 225 nm, about 233 nm, about 250 nm, or any value or range of values between the foregoing exemplary diameters, according to various embodiments), having an ordered structure, and/or having hydrophobic surface(s).

Similarly, 2D graphene may be characterized by being substantially flat, having an ordered structure, and/or having hydrophobic surface(s).

Doped carbons may include any of the other carbon allotropes described herein, and equivalents thereof that would be appreciated by skilled artisans, but may be doped with one or more dopants such as oxygen, nitrogen, and/or silicon, in various approaches.

In some cases, the composite material may be characterized by a non-laminate structure and may substantially exclude metals, ceramics, and cermets.

The composite material may be electrically conductive and may be characterized by a crystal grain size in a range from about 2 nm to about 200 nm. For instance, in various embodiments the crystal grain size may be any value or range of values within the broad amount of about 2 nm to about 200 nm, such as about 5 nm, about 10 nm, about 25 nm, about 33 nm, about 50 nm, about 66 nm, about 75 nm, about 100 nm, about 125 nm, about 133 nm, about 150 nm, about 166 nm, about 175 nm, about 190 nm, about 200 nm, or any range of values between the foregoing, or other values within the range of about 2 nm to about 200 nm set forth above.

The carbon allotrope may form an anchor bridging a first region of the polymer and a second region of the polymer.

In other aspects, the composite materials disclosed herein may provide several advantages over conventional anti-ballistic materials. For instance, the single-layer, electrically conductive, carbon-reinforced polymeric materials may provide improved mechanical strength and electrical conductivity, while avoiding the pitfalls of laminate structures. Additionally, these materials may allow for real-time, in-use evaluation of structural integrity, which can be a substantial advantage in anti-ballistic applications. Furthermore, the fabrication of these composite materials may be more consistent and simple, resulting in more uniform structural properties.

FIG. 2B illustrates a composite material 200 for anti-ballistic applications, in accordance with one embodiment. As an option, the composite material 200 may be implemented in the context of any one or more of the embodiments set forth in any previous and/or subsequent figure(s) and/or description thereof. Of course, however, the composite material 200 may be implemented in the context of any desired environment. Further, the aforementioned definitions may equally apply to the description below.

As shown in FIG. 2B, the electrically conductive, carbon-reinforced polymeric layer 202 also experiences microfractures 110 upon impact thereon by a hard projectile 106. However, due to the improved mechanical strength and dispersion of mechanical forces, the area of the fracture conoid is much larger than in conventional bi-layer anti-ballistic materials such as shown in FIG. 1B. For instance, in rigid embodiments of the inventive composite materials, the fracture conoid 108 may be characterized by an angle of about 65 degrees with respect to a surface of the electrically conductive, carbon-reinforced polymeric layer 202 that the hard projectile 106 makes contact with. For semi-flexible and flexible embodiments of the inventive composite materials, the angle of the fracture conoid may vary depending on the build profile, as would be understood by those having ordinary skill in the art upon reading the present disclosure.

FIG. 2C illustrates a composite material 200 for anti-ballistic applications, in accordance with one embodiment. As an option, the composite material 200 may be implemented in the context of any one or more of the embodiments set forth in any previous and/or subsequent figure(s) and/or description thereof. Of course, however, the composite material 200 may be implemented in the context of any desired environment. Further, the aforementioned definitions may equally apply to the description below.

As shown in FIG. 2C, and with contrast to the result shown in FIG. 1C for conventional bi-layer anti-ballistic composites, electrically conductive, carbon-reinforced polymeric layer 202 absorbs and disperses the mechanical forces applied thereto by the hard projectile 106, and deforms, forming a hinge 204 which propagates along a direction parallel to the impacted surface of the electrically conductive, carbon-reinforced polymeric layer 202. This dispersion of mechanical forces prevents failure and penetration of the electrically conductive, carbon-reinforced polymeric layer 202, yielding an improved anti-ballistic composite.

The present descriptions refer often to improved crystallinity of conventional polymers. It shall be understood that such improvements vary depending on the native degree of crystallinity of the polymer in question. For example, with reference to UHMWPE, which may be characterized by a native crystallinity anywhere in a range from about 35% to about 85% (i.e., the theoretical maximum of crystallinity that can be achieved in pure UHMWPE), the degree of increase in crystallinity upon forming a composite material with a carbon allotrope as described herein may be in a range from about 0.1% to about 5.4%. While at first glance these values may seem modest, those having ordinary skill in the art will appreciate that even a 0.1% increase in crystallinity over the theoretical maximum of 85% for pure UHMWPE corresponds to a substantial improvement in mechanical strength and ability to disperse mechanical forces.

Accordingly, in particularly preferred embodiments, the presently described composite materials exhibit a degree of crystallinity that exceeds the native theoretical maximum crystallinity of the polymer component of the composite material.

Figure 3A:
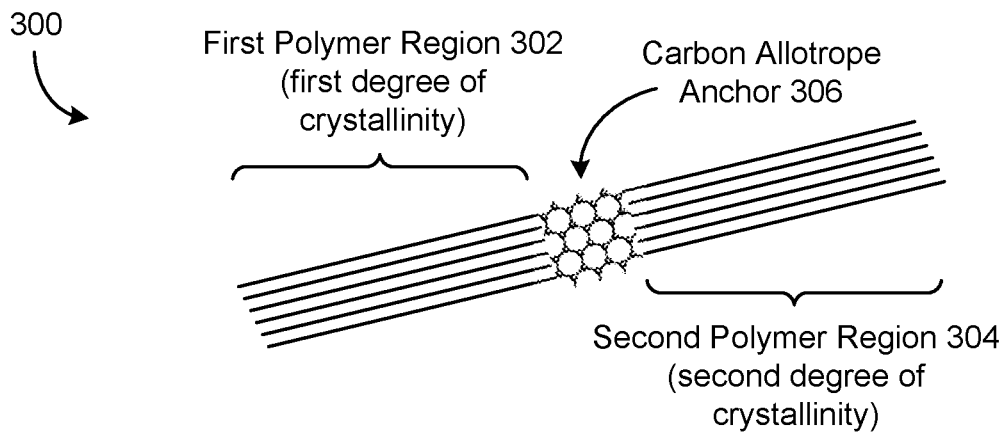
FIGS. 3A-3C depict simplified schematics of composite materials having adjacent polymeric regions bridged by an anchoring carbon allotrope, according to various implementations of the presently described inventive concepts.
Figure 3B:
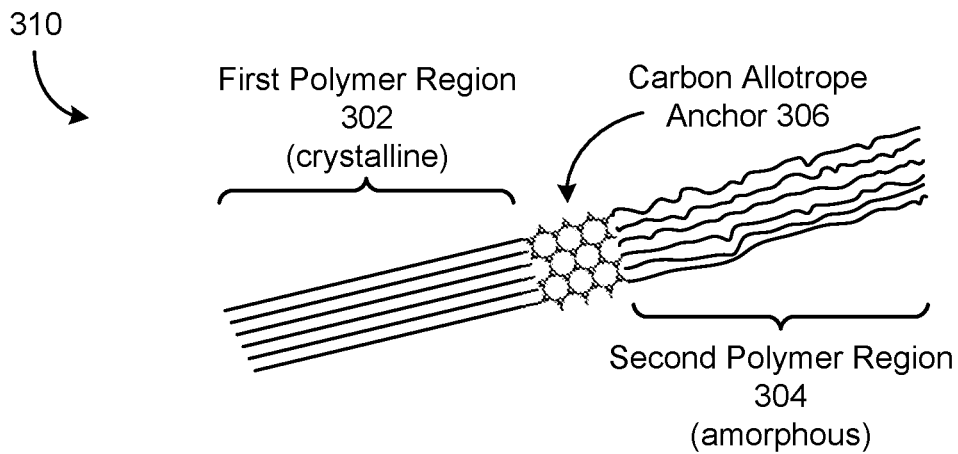
Figure 3C:
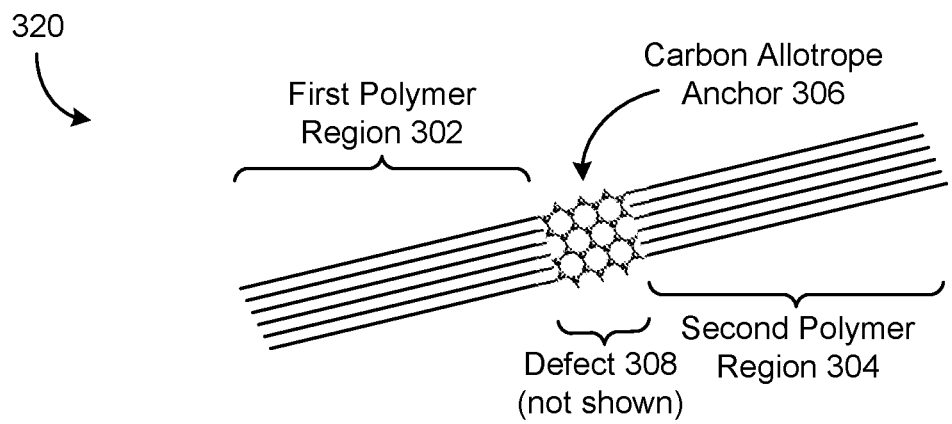

FIGS. 3A-3C depict simplified schematics of composite materials having adjacent polymeric regions bridged by an anchoring carbon allotrope, according to various implementations of the presently described inventive concepts.

In some aspects, as shown in FIG. 3A, a first composite material configuration 300 may include a first polymer region crystalline 302 with a first degree of crystallinity and a second polymer region crystalline 304 with a second degree of crystallinity. A carbon allotrope anchor 306 may bridge the first polymer region crystalline 302 and the second polymer region crystalline 304, enhancing the structural integrity of the polymer regions.

In some cases, as illustrated in FIG. 3B, a second composite material configuration 310 may be formed. The first polymer region crystalline 302 may be connected to a second polymer region 304, which is amorphous, again by the carbon allotrope anchor 306. The carbon allotrope anchor 306 may serve to enhance the structural integrity of the polymer regions, even when the regions exhibit varying degrees of crystallinity.

In other aspects, as depicted in FIG. 3C, a third composite material configuration 320 may be formed. A crystalline structure defect 308 may be situated between the first polymer region 302 and the second polymer region 304. The carbon allotrope anchor 306 may be adjacent to the defect, serving to enhance the structural integrity of the polymer regions in the presence of defects.

In some embodiments, the carbon allotrope in the inventive anti-ballistic composite 200 may form an anchor bridging a first region of the polymer and a second region of the polymer. This configuration may enhance the structural integrity of the composite material, providing improved resistance to ballistic impacts. The carbon allotrope anchor may be particularly advantageous in situations where the polymer regions exhibit varying degrees of crystallinity or the presence of defects, as it may serve to reinforce these regions and improve the overall mechanical strength of the composite material.

In FIG. 3C, the defect 308 in the crystalline structure may be a gap or vacancy in the crystalline structure, an inclusion, etc. as would be understood by those having ordinary skill in the art upon reading the present disclosure.

Without wishing to be bound to any particular theory, the inventors propose that incorporation of the particular carbon allotropes described herein with polymers such as UHMWPE improves crystallinity (potentially beyond the theoretical limit of the polymer alone) via several mechanisms, which may operate synergistically.

First, the relatively high degree of crystallinity possible in UHMWPE (e.g., about 85%) and the presently described carbon allotropes facilitates "recrystallization", e.g., of amorphous polymer regions, polymer regions having lesser degrees of crystallinity, polymer regions having crystalline defects, etc., upon integration of the carbon allotrope, which forms an anchor bridging the respective polymer regions and improves the overall crystallinity of the resulting structure.

In addition, the carbon allotropes (particularly 3DG) improve the bonding between olefin molecules, thus improving the performance of the fiber(s) and the application thereof at high operational temperatures. This is particularly advantageous in the context of aerospace applications.

The addition of carbon allotropes (particularly 3DG) into the solution (e.g., polymer powder in a liquid bath (i.e., solvent, oil, or other easily extractable fluid medium) facilitates positive interaction with the total system. As the polymer becomes further concentrated into a gel, the carbon allotrope gives the polymer additional sites to interact with, which causes the forming composite material to solidify more quickly and/or predictably. As the gel becomes more solid and/or concentrated, the carbon allotrope becomes embedded within the polymer and bridges gaps, regions of different crystallinity, defects, etc. across regions of polymer particles and starts to form a 'loose' bridged network. At this point the polymer powder can resemble floating platforms that are interacting with nearest neighbors.

Figure 3D:
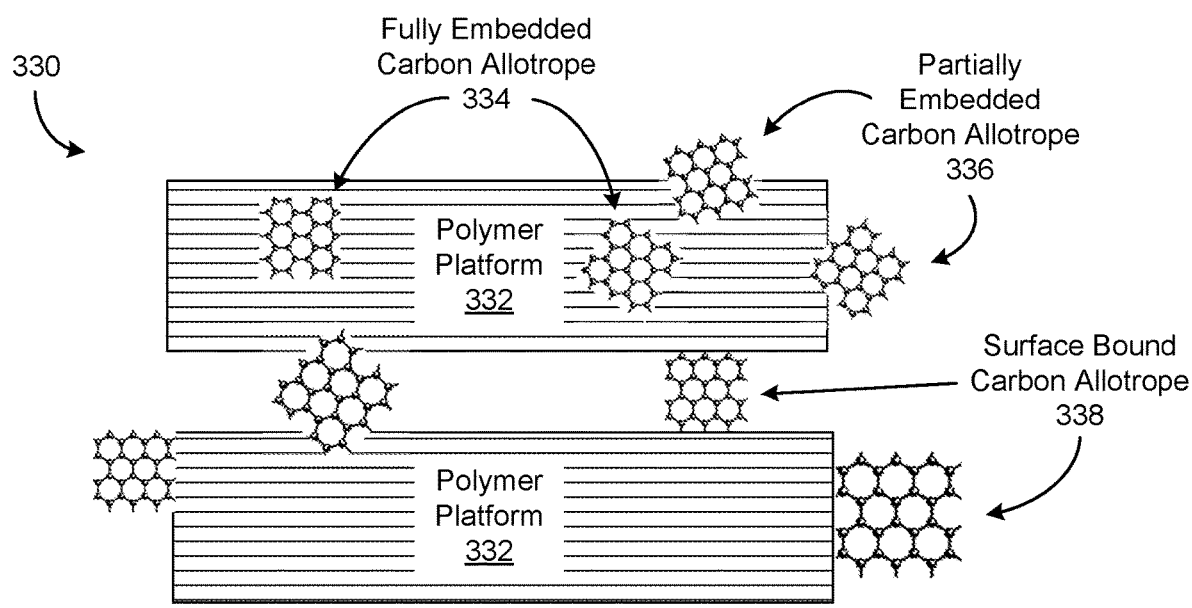
FIG. 3D depicts a simplified schematic of carbon allotropes embedded (fully or partially) in, or bound to surfaces of, polymer platforms during formation of a composite material according to one implementation of the presently described inventive concepts.

According to various embodiments, and as shown schematically in FIG. 3D according to exemplary composite 330, the carbon allotrope(s) may be 1) fully embedded or incorporated into the bulk of the polymer platforms 332, as is the case for fully embedded carbon allotropes 334, 2) partially or completely embedded in surface(s) (e.g., top, bottom, and/or sides of the polymer platform 332), as shown with reference to partially embedded carbon allotropes 336; and/or 3) occupy spaces between the platforms, being bound to surface(s) thereof, such as for surface bound carbon allotropes 338.

In crystalline terminology, the carbon allotrope may be present partially or completely embedded within the lattice network, or coupled (e.g., bound) to surfaces of the lattice network. Completely embedded carbon allotropes can improve the crystallinity of the lattice network, while partially embedded and surface-coupled carbon allotropes can advantageously act as a bridge to adjacent lattice network(s) and/or amorphous regions. These interactions also advantageously allow or facilitate modification of the lattice structure to improve the mechanical properties thereof, e.g., tensile strength, modulus, elongation, etc. as would be understood by a person having ordinary skill in the art upon reading the present disclosure.

In more embodiments, specifically involving carbon allotropes such as 3DG, carbon nano-onions (CNOs), carbon rings, layered carbons, etc., the carbon allotropes may become part of (i.e., not just embedded, but integrated into) the crystal network and can be modified to facilitate incorporation into the network. For example, the carbon allotrope could be small enough to embed itself into the molecular chains of the monomers during polymerization, and be incorporated into the resulting polymer. As another example, carbon allotropes can improve crystal geometry, for example facilitating preferential growth of monoclinic phases and suppressing or limiting growth of triclinic phases.

In another example, carbon allotropes may extend their own crystal network to become part of the polymer network.

In various approaches, the final loading levels of carbon allotrope(s) within the final polymer fiber may be in a range from about 10 ppm to about 5,000 ppma, with specific examples including about 10 ppm, about 25 ppm, about 50 ppm, about 100 ppm, about 200 ppm, about 250 ppm, about 333 ppm, about 400 ppm, about 500 ppm, about 600 ppm, about 666 ppm, about 750 ppm, about 800 ppm, about 900 ppm, about 1,000 ppm, about 1250 ppm, about 1,333 ppm, about 1,500 ppm, about 1,666 ppm, about 1750 ppm, about 1900 ppm, about 2,000 ppm, about 2,500 ppm, about 3,000 ppm, about 3,250 ppm, about 3,333 ppm, about 3,500 ppm, about 3,666 ppm, about 3,750 ppm, about 4,000 ppm, about 4,250 ppm, about 4,500 ppm, about 4,666 ppm, about 4,750 ppm, about 5,000 ppm, or any value or range of values therebetween. In preferred embodiments, the carbon allotrope(s) are present in an amount ranging from about 100 ppm to about 1,000 ppm. In particularly preferred embodiments, the carbon allotrope(s) are present in an amount ranging from 500 ppm to about 1,000 ppm.

Moreover, the presently disclosed inventive composite materials may be further improved in the particular context of anti-ballistics applications by configuring the geometry of the crystalline portions of the polymer and/or carbon allotrope(s). In exemplary approaches, the polymer may be characterized by a crystalline geometry that is at least about 60% orthorhombic, at least about 2% monoclinic, a nonzero amount of about 1% or less triclinic, or, preferably, all three. Exemplary proportions of orthorhombic geometry may be, e.g., about 66%, about 70%, about 75%, about 80%, about 85%, about 90%, about 95%, about 98%, about 99%, about 100%, or any value or range of values therebetween, in various embodiments. Exemplary proportions of monoclinic geometry may be, e.g., about 2%, about 5%, about 6.66%, about 7.5%, about 10%, about 12.5%, about 15%, about 20%, about 25%, about 33%, about 40%, about 50%, about 66%, about 75%, about 80%, about 90%, about 95%, about 98%, about 99%, about 100%, or any value or range of values therebetween, in various embodiments. Exemplary proportions of monoclinic geometry may be, e.g., about 0.001%, 0.01%, 0.1%, 0.2%, 0.25%, 0.33%, 0.4%, 0.5%, 0.66%, 0.75%, 0.8%, 0.9%, 0.95%, 0.98%, 0/.99%, 1.0%, or any value or range of values therebetween, in various embodiments.

Figure 4:
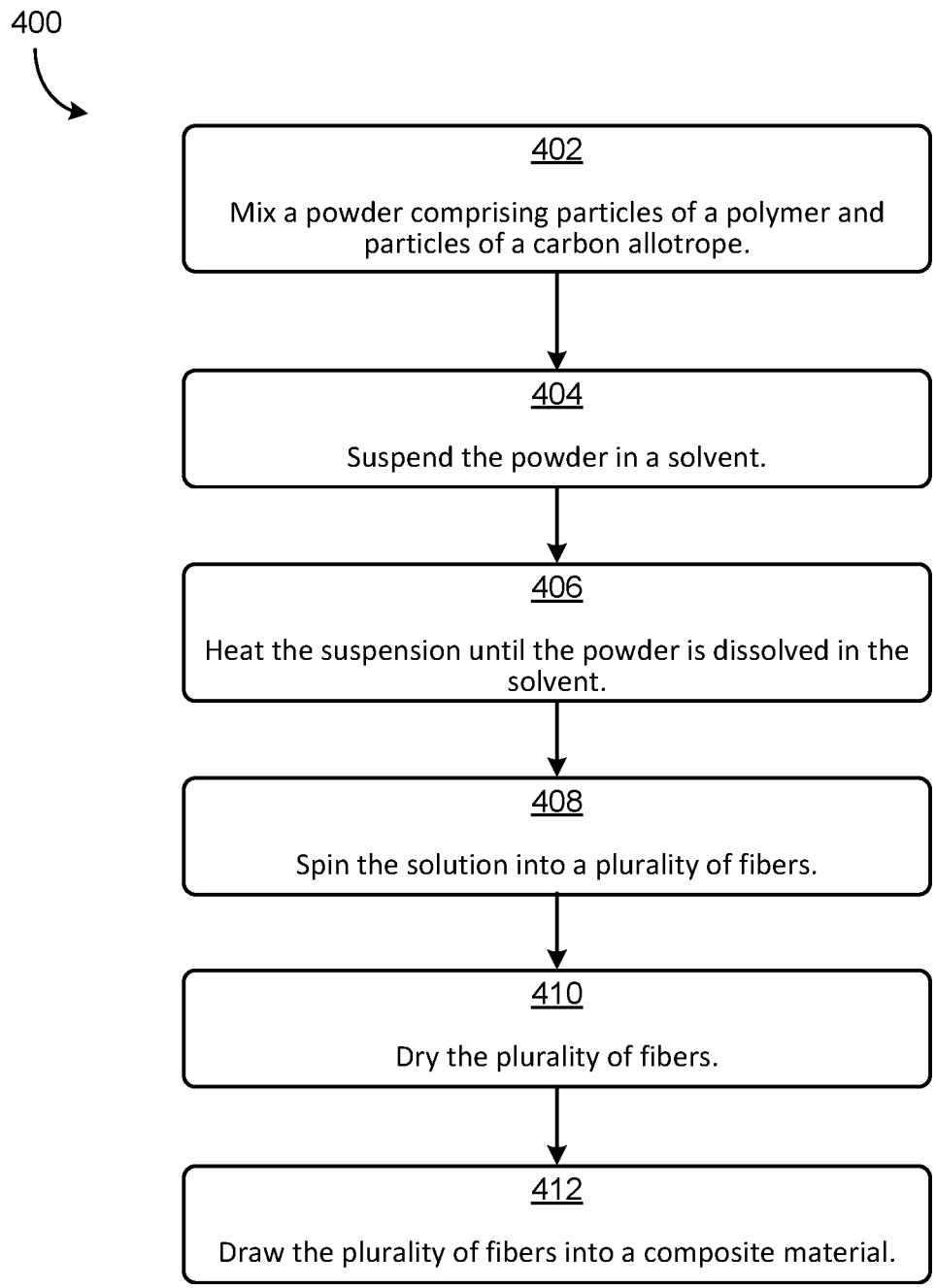
FIG. 4 depicts a flowgram of a method for fabricating composite materials as described herein, according to one implementation.

FIG. 4 illustrates a method 400 for fabricating a composite material, in accordance with one embodiment. As an option, the method 400 may be implemented in the context of any one or more of the embodiments set forth in any previous and/or subsequent figure(s) and/or description thereof. Of course, however, the method 400 may be implemented in the context of any desired environment. Further, the aforementioned definitions may equally apply to the description below.

As shown in FIG. 4, method 400 includes operation 402, where a powder comprising particles of a polymer and particles of a carbon allotrope are mixed together.

In operation 404 of method 400, the powder is suspended in a solvent. The solvent may be chosen, in various implementations, according to the properties (e.g., polar, non-polar, organic, aqueous, etc.) of the components of the powder mixture. For instance, in an illustrative approach where the polymer includes UHMWPE and one or more carbon allotropes, the solvent is or comprises acetone.

According to various approaches, mixing of the powder in operation 402, and/or suspending of the powder in the solvent in operation 404 may include any suitable technique, such as sonication, stirring, shaking, inverting, injecting, etc. as would be appreciated by persons having ordinary skill in the art upon reading the present disclosure.

With continuing reference to FIG. 4, operation 406 of method 400 involves heating the suspension until the powder is dissolved in the solvent. The heat may be provided in any suitable form and using any suitable technique that would be understood by skilled artisans upon reviewing the instant descriptions, according to various embodiments.

For example, heat may be applied by placing the suspension in a heated chamber such as an oven, by applying flame to a container containing the suspension, via infrared radiation applied to a container containing the solution, via exothermal reaction(s) taking place within the suspension, or any other suitable technique as would be appreciated by those having ordinary skill in the art after reviewing the present disclosure.

Moreover, the heating may be performed in any suitable environment, such as under an oxygen-containing atmosphere, an atmosphere excluding oxygen such as an argon atmosphere or nitrogen atmosphere, under a vacuum, etc. according to various aspects.

In one exemplary approach involving a powder comprising UHWMPE and carbon allotrope(s) suspended in acetone, operation 406 involves heating the suspension to a temperature of at least about 200 C for a duration ranging from about 90 seconds to about 15 minutes. Of course, according to different implementations, different temperatures, durations, and/or heating environments may be utilized without departing from the scope of the presently described inventive concepts. The only limitation on such heating is that the resulting solution should comprise a composite material including the polymer and carbon allotrope(s) incorporated therein, preferably at least partially incorporated into a crystalline structure of the polymer, and more preferably incorporated in such a manner that the carbon allotrope(s) form anchor(s) bridging different regions (e.g. of different degrees of crystallinity, crystalline and amorphous regions, regions separated by a crystalline defect, etc.) of the crystalline structure of the polymer.

Operation 408 of method 400 includes spinning the solution into a plurality of fibers. The spinning may, in various implementations, be performed using any suitable technique as would be appreciated by those having ordinary skill in the art upon reading the present disclosure. In one exemplary approach, spinning may be performed using a spinning pump that provides the solution containing the composite material to a spinneret, which spins out fibers of the composite material, optionally into a receptacle containing a bath (such as a water bath, to cool the spun fiber to a desired temperature for subsequent drawing into desired configurations).

In operation 410, method 400 continues with drying the plurality of fibers. As with the heating performed in operation 406, drying of the fibers may be performed using any suitable technique and conditions that would be appreciated by those having ordinary skill in the art upon reading the present disclosure. For instance, in one approach drying may be performed in an oven.

With continuing reference to FIG. 4, operation 412 of method 400 involves drawing the plurality of fibers into a composite material. Drawing of the fibers may be accomplished in any suitable manner that would be appreciated by those having ordinary skill in the art upon reading the instant disclosure. For example, drawing may involve applying tension to the spun fiber using a plurality of pulleys, rollers, etc. Moreover, in some approaches drawing of the plurality of fibers may be performed simultaneous to drawing the fibers as descried with reference to operation 410 above.

Figure 5:
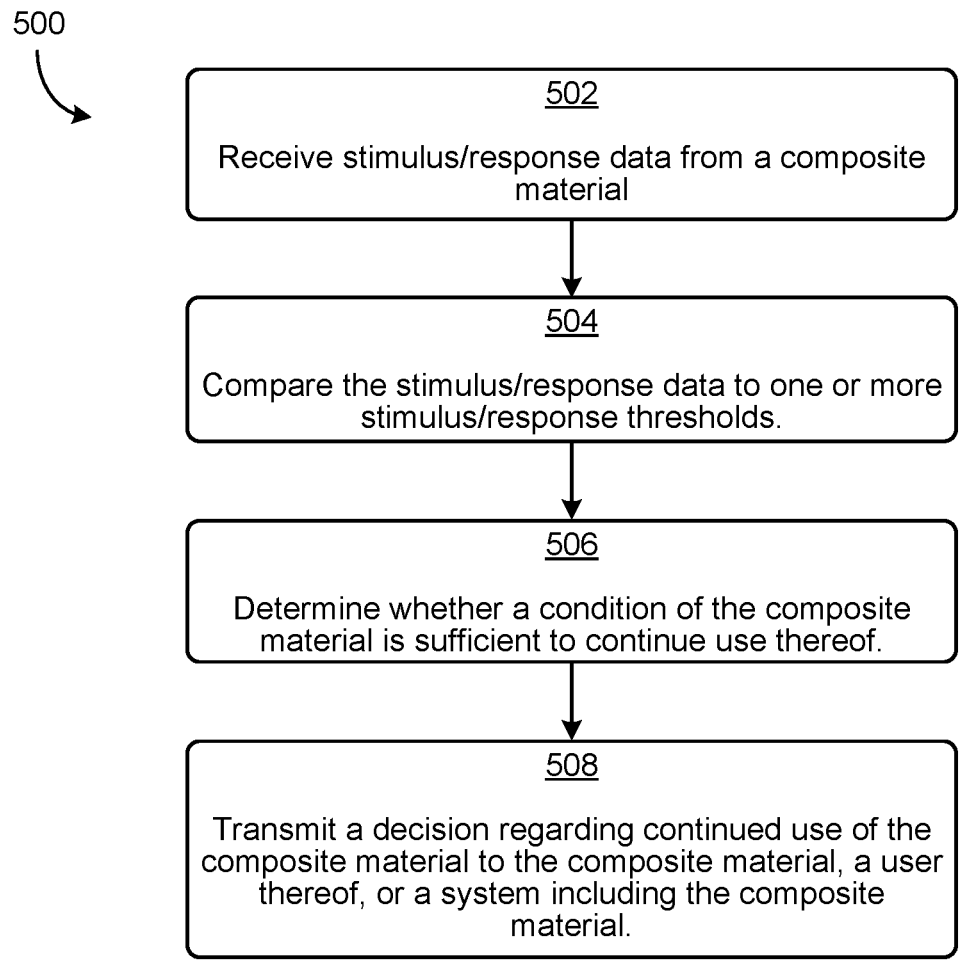
FIG. 5 depicts a flowgram of a method for utilizing composite materials as disclosed herein, according to an illustrative approach.

Turning now to use of the presently described inventive composite materials, FIG. 5 illustrates a method 500 for utilizing a composite material, in accordance with one embodiment. As an option, the method 500 may be implemented in the context of any one or more of the embodiments set forth in any previous and/or subsequent figure(s) and/or description thereof. Of course, however, the method 500 may be implemented in the context of any desired environment. Further, the aforementioned definitions may equally apply to the description below.

As shown in FIG. 5, method 500 includes operation 502, in which stimulus/response data are received from the composite material.

With continuing reference to FIG. 5, method 500 includes operation 504, which involves comparing the stimulus/response data to one or more stimulus/response thresholds.

According to various embodiments, stimulus/response data may include electrical conductivity data obtained from or about the composite material.

Operation 506 of method 500 includes determining whether a condition of the composite material is sufficient to continue use thereof.

In operation 508, a decision regarding continued use of the composite material is transmitted to the composite material, a user thereof, or a system including the composite material.

The stimulus/response data received from the composite material preferably comprise information regarding the mechanical integrity of the composite material. Mechanical integrity may be evaluated according to any suitable technique or measure that would be appreciated by those having ordinary skill in the art upon reading the present disclosures. For example, mechanical integrity may be informed by measures such as tensile strength, compressive strength, elasticity, hardness, etc. according to various approaches.

The threshold(s) to which received stimulus/response data are compared may include any suitable measures and/or be based on any suitable technique that would be understood by skilled artisans upon reading the instant descriptions. For example, in one illustrative implementation, threshold(s) may include known "failure points" beyond which the composite material is known to fail to possess sufficient operational capacity in the field. Sufficient operational capacity may be characterized in any appropriate manner, such as mechanical strength (e.g., ability to withstand additional impact from ballistic projectile(s) without failure of the composite material, without penetration of the composite material by subsequent impact(s), etc.), electrical conductivity (which may indicate whether or not the composite material may continue providing information about the composite material, the user of the composite material, or a system including the composite material), or any other suitable stimulus/response data described herein or as would be appreciated by a person having ordinary skill in the art upon reading the present disclosure.

Comparing received stimulus/response data to corresponding stimulus/response thresholds may be performed in any suitable manner that would be understood by skilled artisans upon reviewing the descriptions provided herein. For instance, comparing data may include a direct evaluation of whether the received stimulus/response data exceeds, meets, or is exceeded by, a corresponding threshold. Comparing data may involve more complex operations, such as converting received data to a particular form more suitable for comparison to the corresponding threshold(s). Various additional or alternative operations may be involved in the comparison, according to different implementations of the inventive concepts presented herein.

Similarly, determining whether the condition of the composite material is sufficient to continue use thereof may include any suitable techniques that would be appreciated by those having ordinary skill in the art upon reading the instant disclosure. For instance, the determination may be based on whether the received stimulus/response data exceed, meet, or are exceeded by corresponding threshold stimulus/response data. Determining whether the condition of the composite material is sufficient to continue use thereof may involve more complex operations, such as evaluating multiple thresholds and combining the result thereof to make the ultimate determination. Various additional or alternative operations may be involved in the determination, according to different implementations of the inventive concepts presented herein.

In more embodiments, the determination may involve determining a degree of crystallinity of the composite material, and/or a type of crystallinity of the composite material (and, optionally, respective amounts of different crystalline phases), in order to investigate the mechanical strength and/or properties of the composite material pre- and post-impact.

The determination preferably includes a clear, simple direction, such as "discontinue use", "continue operation", or a warning that the composite material is approaching critical operational status.

Once the determination is made, a decision regarding whether to continue use of the composite material is transmitted to the composite material (or a suitable receiver communicatively connected thereto), or transmitted directly to the user (e.g., in the case of armor) or a system implementing the composite material (e.g., a spacecraft in which the composite material is included as a protective mechanism against ballistic impacts by micrometeoroids, space debris, etc.). The decision may be transmitted in any suitable manner that would be understood by those having ordinary skill in the art upon reading the present disclosure.

In particularly preferred approaches, the foregoing operations are performed continuously, or substantially continuously, to provide real-time information regarding operational status of the composite material.

Of course, it shall be understood that in additional embodiments, the method 500 may include receiving other types of data, such as diagnostic data regarding the user and/or system including the composite material. Furthermore, the method may include evaluating such diagnostic data and making corresponding decisions (including, but not limited to, whether to continue operation).

For example, diagnostic biological data (e.g., body temperature, heart rate, presence of moisture (sweat), specific blood oxygen level, insulin level, etc.) may be evaluated to determine whether to instruct the user to pause operation for a predetermined interval, whether to seek out particular environmental conditions (e.g. certain temperatures, shade, etc.), whether to administer food, water, medication, etc., or any other suitable evaluation and instruction that would be appreciated by persons having ordinary skill in the art upon reading the present disclosure.

In other approaches, diagnostic electrical data, such as potential, current, impedance, resistivity, etc., may be utilized to evaluate operational capacity of a system electrically coupled to the composite material, such as a satellite, rocket, or other spacecraft. Based on the evaluation, one or more components of the system may be taken offline, set to a reduced operational mode, or allowed to continue normal operation. Additionally, system logs may be recorded to allow future evaluation of the system and/or a given operation performed by the system.

The aforementioned diagnostic data may be obtained, or derived from, evaluating the electrical conductivity of the composite material, according to select implementations.

Applications/Uses

As mentioned hereinabove, the presently described inventive concepts have utility in a variety of applications.

These include, but are not limited to, utilization of composite materials as armors or components of armors of various types. Advantageously, the inventive composite materials convey both improved mechanical strength and reduced weight (i.e., improved strength-to-weight ratio) compared to conventional composite anti-ballistic materials. This improved strength-to-weight ratio is particularly apparent in embodiments excluding metals, ceramics, cermets, etc. in the composite material. Moreover, in some approaches a ceramic, metal, or cermet support plate may be omitted without sacrificing mechanical strength of the composite material.

Such armors may be implemented in a variety of systems and use cases, such as aviation, aerospace applications, vehicular applications, aquatic applications, etc. Without limitation, exemplary systems that may benefit from utilizing the presently disclosed composite materials may include satellites, rockets, armored vehicles, tanks, submarines, ships, airplanes, etc.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The term "about" when used to modify a numerical value or range of values set forth herein shall be understood as encompassing the stated value±10%. So, for example, "about 5 nm" includes any value from 4.5 nm to 5.5 nm. "About 100 nm" includes any value from 90 nm to 110 nm, and so forth.

It should be understood that the arrangement of components illustrated in the Figures described are exemplary and that other arrangements are possible. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the claims and their equivalents. The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A composite material, comprising:
    a polymer comprising ultra-high molecular weight polyethylene (UHMWPE); and
    a carbon allotrope incorporated into a crystalline structure of the polymer, wherein the composite material is characterized by a crystallinity that is at least about 1.33% greater than a native crystallinity of the polymer in absence of the carbon allotrope, and wherein the composite material is characterized by a single-layer structure.

2. The composite material of claim 1, wherein the polymer comprises a plurality of fibers, and wherein at least about 95% of the fibers are characterized by a common orientation.

3. The composite material of claim 1, wherein the native crystallinity of the polymer in absence of the carbon allotrope is in a range from about 35% to about 85%.

4. The composite material of claim 1, carbon allotrope comprises three-dimensional graphene (3DG).

5. The composite material of claim 1, wherein carbon allotrope is selected from the group consisting of: 2D graphene, 3D graphene, carbon nano-onions (CNOs), graphene platelets, polyaromatic hydrocarbons (PAHs), doped graphene, layered carbons, carbon rings, and combinations thereof.

6. The composite material of claim 1, wherein the carbon allotrope is present in an amount ranging from about 10 ppm to about 900 ppm.

7. The composite material of claim 1, wherein:
    at least about 60% of the crystalline structure of the polymer is characterized by an orthorhombic geometry; and
    at least about 2% of the crystalline structure of the polymer is characterized by a monoclinic geometry.

8. The composite material of claim 7, wherein at least some of the crystalline structure of the polymer is characterized by a triclinic geometry.

9. The composite material of claim 1, wherein the composite material substantially excludes metals, ceramics, and cermets.

10. The composite material of claim 1, wherein the composite material is electrically conductive.

11. The composite material of claim 1, wherein at least some of the carbon allotrope forms an anchor bridging a first region of the polymer and a second region of the polymer, and wherein the first region of the polymer and the second region of the polymer are adjacent.

12. The composite material of claim 1, wherein portions of a crystal network of the carbon allotrope extend into the crystalline structure of the polymer.

13. A composite material, comprising:
    a polymer comprising ultra-high molecular weight polyethylene (UHMWPE); and
    a carbon allotrope incorporated into a crystalline structure of the polymer, wherein the composite material is characterized by a crystallinity that is at least about 1.33% greater than a native crystallinity of the polymer in absence of the carbon allotrope, wherein the composite material is characterized by a non-laminate structure, and wherein the composite material is characterized by a crystal grain size in a range from about 2 nm to about 50 nm.

14. A composite material, comprising:
a polymer comprising ultra-high molecular weight polyethylene (UHMWPE), wherein the polymer is characterized by a first crystallinity; and
a carbon allotrope incorporated into a crystalline structure of the polymer;
wherein the composite material is characterized by a second crystallinity that is at least about 1.33% greater than the first crystallinity; and
wherein the composite material is characterized by a single-layer structure.

15. The composite material as recited in claim 14, wherein the first crystallinity is in a range from about 35% to about 85%.

16. The composite material of claim 14, wherein the carbon allotrope comprises three-dimensional graphene (3DG).

17. The composite material of claim 14, wherein the polymer comprises a plurality of fibers, and wherein at least about 95% of the fibers are characterized by a common orientation.

18. The composite material of claim 14, wherein carbon allotrope is selected from the group consisting of: 2D graphene, 3D graphene, carbon nano-onions (CNOs), graphene platelets, polyaromatic hydrocarbons (PAHs), doped graphene, layered carbons, carbon rings, and combinations thereof.

19. The composite material of claim 14, wherein the carbon allotrope is present in an amount ranging from about 10 ppm to about 900 ppm.

20. The composite material of claim 14, wherein:
at least about 60% of the crystalline structure of the polymer is characterized by an orthorhombic geometry; and
at least about 2% of the crystalline structure of the polymer is characterized by a monoclinic geometry.

21. The composite material of claim 20, wherein at least some of the crystalline structure of the polymer is characterized by a triclinic geometry.

22. The composite material of claim 14, wherein the composite material substantially excludes metals, ceramics, and cermets.

23. The composite material of claim 14, wherein the composite material is electrically conductive.

24. The composite material of claim 14, wherein at least some of the carbon allotrope forms an anchor bridging a first region of the polymer and a second region of the polymer, and wherein the first region of the polymer and the second region of the polymer are adjacent.

25. The composite material of claim 14, wherein incorporation of the carbon allotrope into the crystalline structure of the polymer comprises at least some of the carbon allotrope being embedded into both a bulk of the polymer and molecular chains of at least some molecules of the polymer.

26. A composite material, comprising:
a polymer comprising ultra-high molecular weight polyethylene (UHMWPE), wherein the polymer is characterized by a first crystallinity; and
a carbon allotrope incorporated into a crystalline structure of the polymer;
wherein the composite material is characterized by a second crystallinity that is at least about 1.33% greater than the first crystallinity;
wherein the composite material is characterized by a non-laminate structure; and
wherein the composite material is characterized by a crystal grain size in a range from about 2 nm to about 50 nm.

* * * * *